(12) United States Patent  
Armanino et al.

(10) Patent No.: US 8,073,819 B2
(45) Date of Patent: Dec. 6, 2011

(54) SYSTEM AND METHOD FOR STORING ELEMENT INFORMATION

(75) Inventors: Frederick Michael Armanino, San Antonio, TX (US); Peter A. Wong, Newark, CA (US); Mengfeng Tsai, Fremont, CA (US); Theresa Jayne Lees, Sunnyvale, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 446 days.

(21) Appl. No.: 10/842,841

(22) Filed: May 11, 2004

(65) Prior Publication Data

US 2005/0256886 A1    Nov. 17, 2005

(51) Int. Cl.
*G06F 7/00*    (2006.01)
(52) U.S. Cl. ........................................ 707/688; 709/224
(58) Field of Classification Search .................. 707/100
See application file for complete search history.

(56) References Cited

U.S. PATENT DOCUMENTS

| | | | |
|---|---|---|---|
| 4,879,558 A | 11/1989 | Swanson | |
| 5,247,638 A | 9/1993 | O'Brien et al. | |
| 5,546,575 A | 8/1996 | Potter et al. | |
| 6,002,694 A * | 12/1999 | Yoshizawa et al. | 370/486 |
| 6,317,747 B1 | 11/2001 | Bolan et al. | |
| 6,334,126 B1 * | 12/2001 | Nagatomo et al. | 707/4 |
| 6,502,131 B1 * | 12/2002 | Vaid et al. | 709/224 |
| 6,570,511 B1 | 5/2003 | Cooper | |
| 6,714,979 B1 * | 3/2004 | Brandt et al. | 709/225 |
| 6,748,426 B1 * | 6/2004 | Shaffer et al. | 709/219 |
| 6,886,020 B1 * | 4/2005 | Zahavi et al. | 707/204 |
| 6,985,901 B1 * | 1/2006 | Sachse et al. | 707/10 |
| 7,100,199 B2 * | 8/2006 | Ginter et al. | 726/4 |
| 7,373,330 B1 * | 5/2008 | Klebe | 705/51 |
| 7,870,244 B2 * | 1/2011 | Chong et al. | 709/224 |
| 2001/0039537 A1 * | 11/2001 | Carpenter et al. | 705/400 |
| 2003/0061195 A1 * | 3/2003 | Laborde et al. | 707/1 |

* cited by examiner

*Primary Examiner* — Christyanne Pulliam
(74) *Attorney, Agent, or Firm* — Toler Law Group

(57) ABSTRACT

A system and method are disclosed for storing element information. A method incorporating teachings of the present disclosure may include, for example, creating a structured text object that includes information representing a collection of metrics for a tracked network node. The network node may be, for example, a computing device, a communication link, and/or an interface mechanism. In practice, the text object may be compressed into a binary element, and the binary element may be stored in a data store.

22 Claims, 3 Drawing Sheets

SYSTEM AND METHOD FOR STORING ELEMENT INFORMATION

FIELD OF THE INVENTION

The present disclosure relates generally to managing information about network elements, and more specifically to a system and method for storing element information.

BACKGROUND

A network may be characterized by several factors like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communication networks.

At a physical level, a communication network may include a series of nodes interconnected by communication paths. These nodes and communication paths may represent elements of the network. Other elements may include applications, objects, other networks, software, firmware, and/or hardware, associated with the network. As such, a given network may include several elements, and proper management of the network may involve the daunting task of tracking and maintaining several pieces of information for each of these elements.

As the number of to-be-tracked elements and element characteristics increases and the frequency of tracking these characteristics increases, proper network management can become exceedingly difficult, overly resource intensive, and very expensive. Conventional management solutions tend to rely heavily on the availability of trained people and the scalability of deployed storage and computing resources. Unfortunately, these things may not always be available. Moreover, the cost and complexity of simply growing the network management system may become too high.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Network operators and enterprises often invest a great deal of time and money managing and maintaining their networks. Frequently, these network operators need to make decisions relating to network planning, resource availability, billing, troubleshooting, etc. Making proper decisions often requires a high level of network and user awareness. The individual or entity tasked with making these decisions may need to know or have access to volumes of information describing the past, current, and future status of the network. Moreover, this information may need to be readily-available and presentable to the decision makers in near real time.

As the size of the network and the number of network elements increases, the shear volume of information to be stored may become quite large. Moreover, a typical network operator may elect to track several metrics for each network element and to update these metrics frequently causing the volume of stored information to continue to increase. The systems and techniques described below focus on helping network operators better manage the use and maintenance of network related information. The described embodiments focus on large communication network implementations and the efficient use of available storage space.

In practice, a method incorporating teachings of the present disclosure may involve creating a structured text object that includes information representing a collection of metrics for a tracked network node. The network node may be, for example, a computing device, a communication link, and/or an interface mechanism. In some embodiments, the text object may be compressed into a binary element, and the binary element may be stored in a data store.

Making use of such a method may assist in relieving the over utilization of tablespace in some conventional databases that store vast amounts of detail metrics over long periods of time. In preferred embodiments, a system and/or method that incorporates teachings of the present disclosure may allow for a savings of up to 80% in tablespace—reducing physical disk space requirements, which may result in capital savings. Moreover, a user may realize an increase in application performance due to reduction in disk I/O activities and an increase in the ease of data object management in the database as a result of having smaller table sets and fewer individual records.

While the following discussion focuses on large networks like the Public Switched Telephone Network (PSTN), wide area wireless networks, cable networks, managed Internet Protocol IP networks, etc., the teachings disclosed herein may also be used in other environments. For example, enterprise networks, local area networks (LANs), home LANs, the Public Internet, and/or other multiple element networks may also make use of the teachings disclosed herein.

Figure 1:
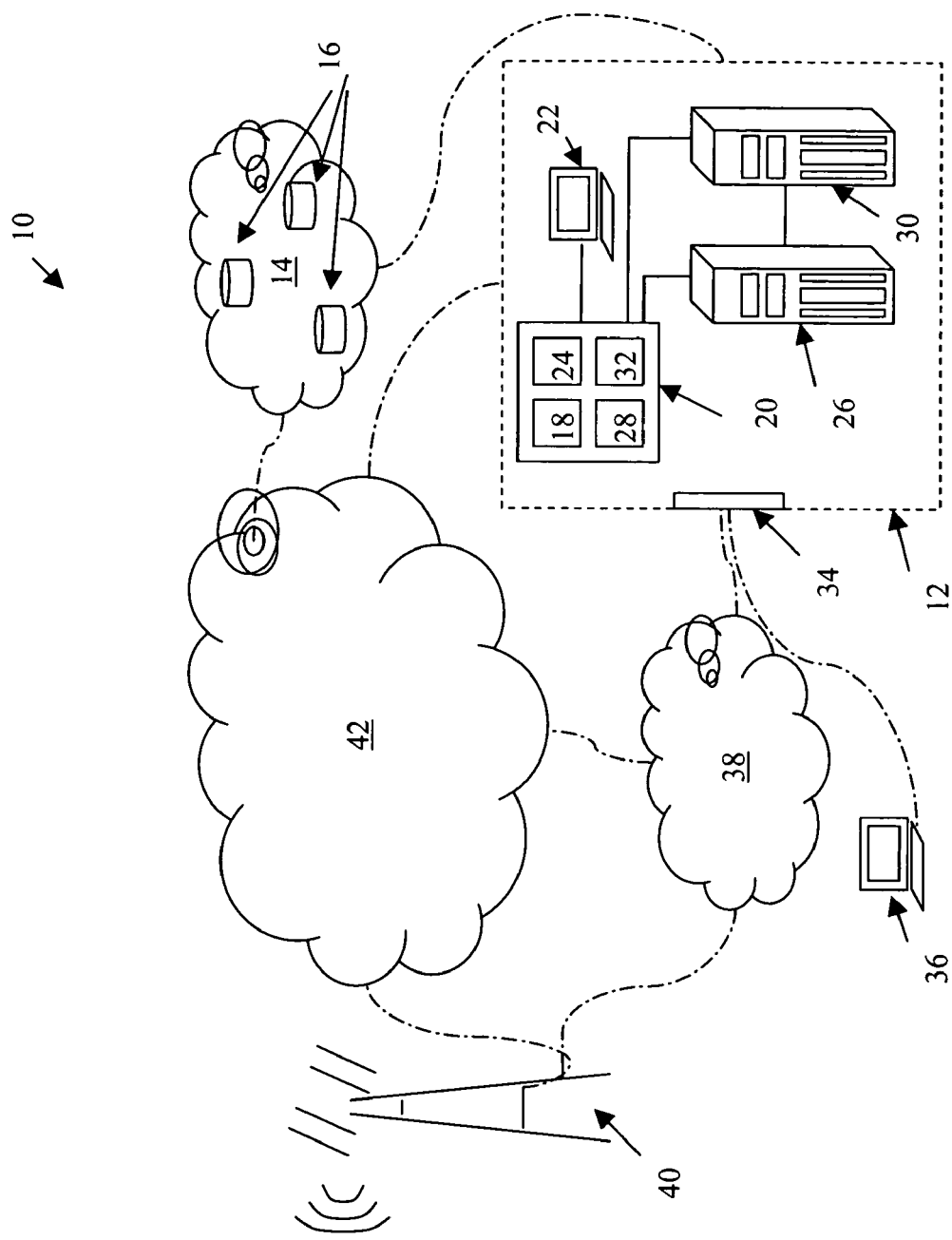
FIG. 1 shows one embodiment of a distributed management system that incorporates teachings of the present disclosure to facilitate storing and retrieving network-related information.

As mentioned above in the brief description of the drawings, FIG. 1 shows one embodiment of a distributed system 10 that incorporates teachings of the present disclosure to facilitate network node information management. System 10 includes a network operations center (NOC) 12 that contains several components. As depicted, NOC 12 may include facilities storing or at least having access to a great deal of network related information. In practice, NOC 12 may include a room containing visualizations of the network or networks being monitored. NOC 12 may also have several workstations that show graphical representations of the network and/or that provide access to a detailed and near real-time status of the network and its nodes. The network operations center may act as the focal point for network troubleshooting, performance monitoring, third party network coordination, software maintenance and distribution, as well as other activities like router and domain name management.

NOC 12 may rely on manual command line interface interaction and/or software tools that use Simple Network Monitoring Protocol (SNMP) to manage and maintain information about a monitored network 14 and its monitored elements 16, which may include hardware, software, firmware, or combinations thereof. Depending upon implementation detail, SNMP may represent an effective way of determining if devices on a network like monitored elements 16 are operating properly. With SNMP, a monitored element may effectively monitor its own activity using built-in software programs sometimes referred to as agent software. Monitored elements 16 may store information about their own activity in a local data store or database called a management information base (MIB). The information stored in a local MIB may represent protocol data units (PDUs). An overall network management engine 18, like IBM's NetView, may be running as an application or engine on a NOC server 20 and may be capable of initiating a query to various agents on network 14 and effectively "ask" for a copy of their respective MIB information.

In practice, SNMP may be less of a "protocol" and more of a client server application that runs on the User Datagram Protocol UDP service of the TCP/IP protocol suite. Moreover, SNMP may not be the only option for network management "protocols". For example, Common Management Information Protocol (CMIP) may be used to provide a powerful and secure alternative to SNMP. However, CMIP may require more overhead than SNMP.

Whatever the basis of the deployed network management system, the tools used may be very powerful and productive—potentially generating a great deal of element information that may need to be presented to a network operator or user via management console 22. In the embodiment depicted in FIG. 1, system 10 and NOC 12 may improve upon conventional techniques for accessing relevant network information. For example, a node of NOC 12 and/or some other capable node may be storing a binary element in a memory. The binary element may represent, for example, a compressed structured text object that is made up of a collection of information describing some tracked value or values (metric) for a given network node.

In operation, the maintained element information may be accessible through multiple modes of interaction, either individually or together. These modes and their implementation may include, among other things, GUIs, speech interaction, visual interaction, pen or stylus interaction, gestures-based interaction, quasi-virtual reality interaction or some other Haptics-based interaction. As such, NOC 12 may facilitate various modalities of human to computer interaction—simplifying the sharing of network information between multiple devices and multiple people.

In some embodiments, a system incorporating teachings of the present disclosure may be able to adapt information exchange to a given device, to a user preference, and/or network state or other condition. For example, an access device engine 24 may be capable of determining an access device type used by a calling or accessing party to interact with the network management engine 18. In some embodiments, access device engine 24 may include a format converter that can translate at least a portion of available network information into a signal and/or signal type receivable by a given access device type. As such, structured text objects representing maintained information may be created using an appropriate mark-up language. There may be several mark-up languages and techniques employed in system 10 to facilitate this and other capabilities. For example, a designer of system 10 and NOC 12 may elect to use XHTML, SMIL or some other mark-up language in conjunction with a speech recognition engine. Other designers may elect to use XML, VoiceXML, HTML, Voice Browser, Xforms, and/or other mark-up languages.

A managed network system incorporating teachings of the present disclosure may contain several elements. A network management engine 18 and agent software running on monitored elements 16 may be utilized to facilitate the on-going collection of element information. Network management engine 18 may reside at and be executing on a server, workstation or console, like NOC server 20. Network management engine 18 may automatically perform and/or allow a network administrator to perform network management functions and initiate management commands like get, get next, get bulk, inform, and set from a management console 22. As mentioned above, agents and/or other software entities associated with monitored elements 16, may initiate among other things response signals and/or event notifications or traps.

Additional system elements may include a compression engine 24, which may also execute at server 20 and a storage facility 26. Facility 26 may serve as a memory and may support a data store configured to maintain a categorized set of information associated with elements 16. In some embodiments, a provider may want to ensure the availability of element information and may utilize a storage engine 28 to provide one or more storage related services. Engine 28 may facilitate a mirroring of information on facility 30. Engine 28 may also facilitate the implementation of some RAID level striping, Storage Area Network functionality, and/or some clustering capability.

In a centralized implementation like the one depicted in FIG. 1, remote users and/or administrators may need to connect to the central repository for information retrieval. Access engine 32 may perform some level of authorization and authentication in connection with remote access to facilities 26 and 30. Engine 32 may effectively act as a AAA server and at least partially handle information requests received from remote user 36 via interface 34.

As shown, NOC 12 may act as a centralized network-based repository of network element and/or network customer information. In other embodiments, the repository may be distributed and/or may be outside of the network. In a centralized implementation, an operator may elect to operate the system in a service bureau mode—supporting multiple networks and network types. For example, a wireless carrier having a wireless network 38, which may include elements like node 40, may elect to outsource element management services to an operator managing NOC 12. Moreover, elements of a larger network like public network 42, which may be, for example, the PSTN or the Public Internet, may also be tracked with components of NOC 12.

Figure 2:
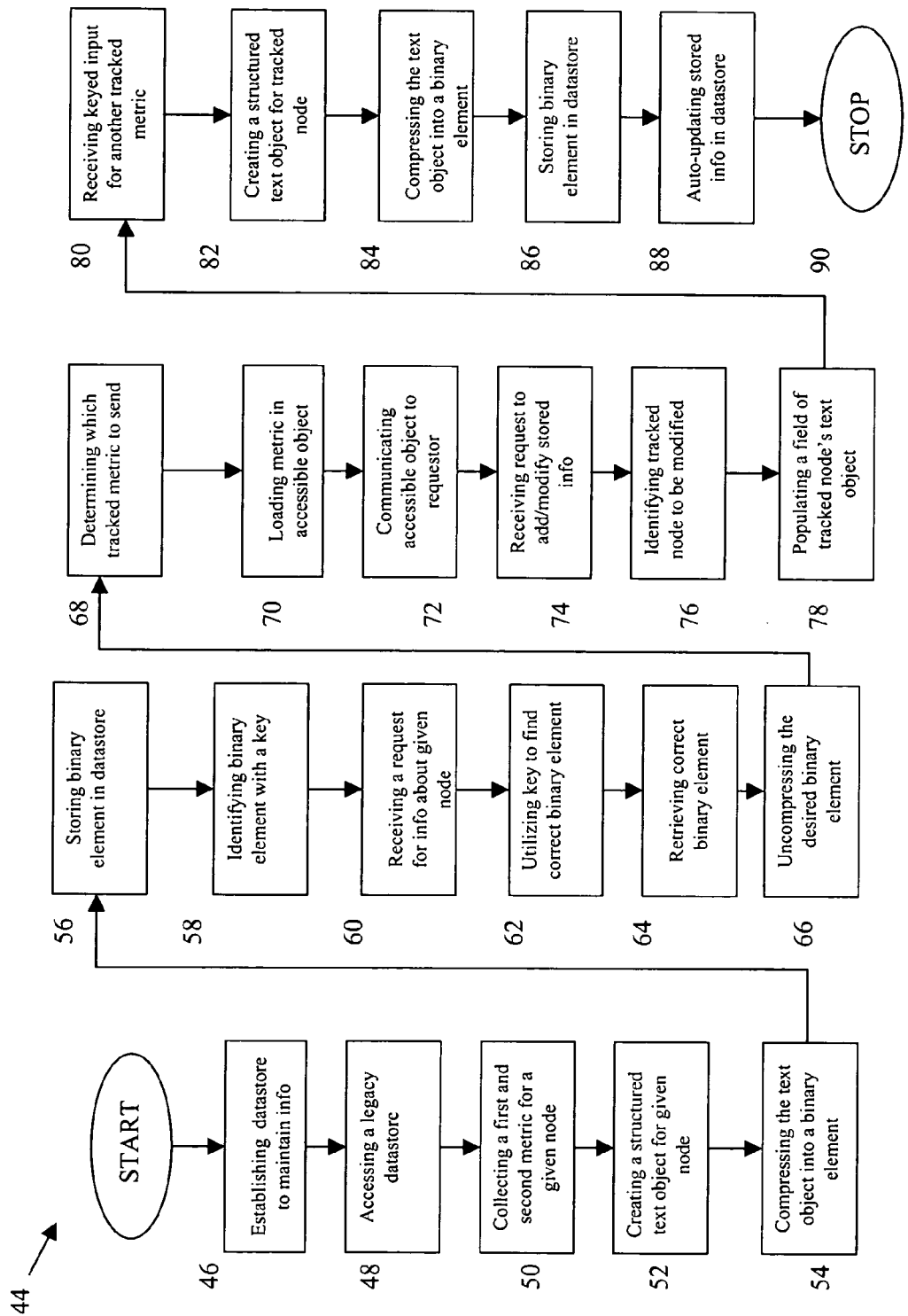
FIG. 2 presents a flow diagram for a process that facilitates network node information storage and retrieval utilizing teachings of the present disclosure.

In some embodiments, various pieces of information including network information may be communicated to an administrator or requestor in near real time and in a format that allows a graphical user interface to display textual information and/or visual representation of the monitored network information. As mentioned above, FIG. 2 presents a flow diagram for a process 44 that facilitates network node information storage and retrieval utilizing teachings of the present disclosure. Process 44 may begin at step 46, which may include establishing a datastore to maintain information. The information to be maintained in the datstore may include some metric that relates to operational and/or physical characteristics of a network such as DSL or cable-related circuit identifiers and link identifiers. Similarly, the information may include additional metrics that relate to customer characteristics like billing cycles, account numbers, elected services, etc.

Occasionally, the information or some subset of the information may exist in a legacy storage system. For example, a spreadsheet may exist that includes several fields populated with individual pieces of information. The spreadsheet may be located in one place and/or in several locations and may be filling a great deal of storage space. At step 48, one or more legacy storage devices may be accessed and a first and a second related metric may be collected therefrom at step 50.

At step 52, a single structured text object may be created from the first and the second metric and the single object may be linked and/or identified as containing multiple pieces of information about a given node, which may be for example a specific network element and/or a specific network user. At step 54, the text object may be compressed into a binary element and stored at step 56 in the data store established at step 46.

In some implementations, an identification key may be associated with the binary element, and this process may occur at step 58. The key may help a system executing process 44 to quickly find a desired binary element. If, for example, a system is storing volumes of information in a datastore, having an effective key system may greatly reduce the time necessary to respond to information requests and/or to modify maintained information. At step 60, a system executing process 44 may receive a request for information about a given tracked element. At step 62, the key system may be used to quickly determine which binary element stored in the datastore contains the requested information.

At step 64, the correct binary element may be retrieved and the element may be uncompressed at step 66. In some embodiments, the binary element will maintain multiple pieces of information; so, at step 68, the system may determine which piece of information maintained in the binary element is the requested metric. At step 70, the identified metric may be loaded into an accessible object and communicated to the requestor at step 72.

In addition to retrieving relevant information, a system executing process 44 may be used to add, modify, and update the maintained information. At step 74, a request to add or modify information may be received, and at step 76 the tracked node affected by the request may be identified. At step 78, an appropriate field of the tracked node's text object may be populated and/or modified. At step 80, another field of the text object may be populated with information keyed in, by a user. Process 44 may then proceed to step 82, where a single structured text object may be created that includes the information input at steps 78 and 80, and the single text object may be linked and/or identified as containing multiple pieces of information about the tracked node. At step 84, the text object may be compressed into a binary element and stored at step 86 in the datastore established at step 46. The process of updating stored information may preferably be automated and this auto-update feature may be initiated at step 88.

In practice, process 44 may continue, may loop, and/or proceed to stop at step 90. Individual steps of process 44 may be amended, re-ordered, added, and/or deleted without departing from the teachings. In addition, the party or device performing various steps may be altered as well to make effective use of available resources within a system implementing some or all of process 44.

As mentioned above, FIG. 3 shows one embodiment of an information access system 92 that incorporates teachings of the present disclosure to maintain and access network information in an efficient manner. System 92 may include, for example, a housing component 94 at least partially defining an external surface and an internal cavity. In some embodiments, a memory 96 may be maintaining a data store configured to hold a compressed form of a structured text object that represents a plurality of metrics for a tracked network node. In such a system, a processor 98 may be at least partially located within the internal cavity formed by housing component 94. Processor 98 may be communicatively coupled to memory 96 and operable to receive a request for a metric included in the structured text object, to retrieve the compressed form of the structured text object from memory 96, to uncompress the compressed form, and to initiate communication of a response to the request that includes the metric in an accessible format. Information may be added, modified, and/or requested from system 92 either locally or from a remote location via interface 100.

Figure 3:
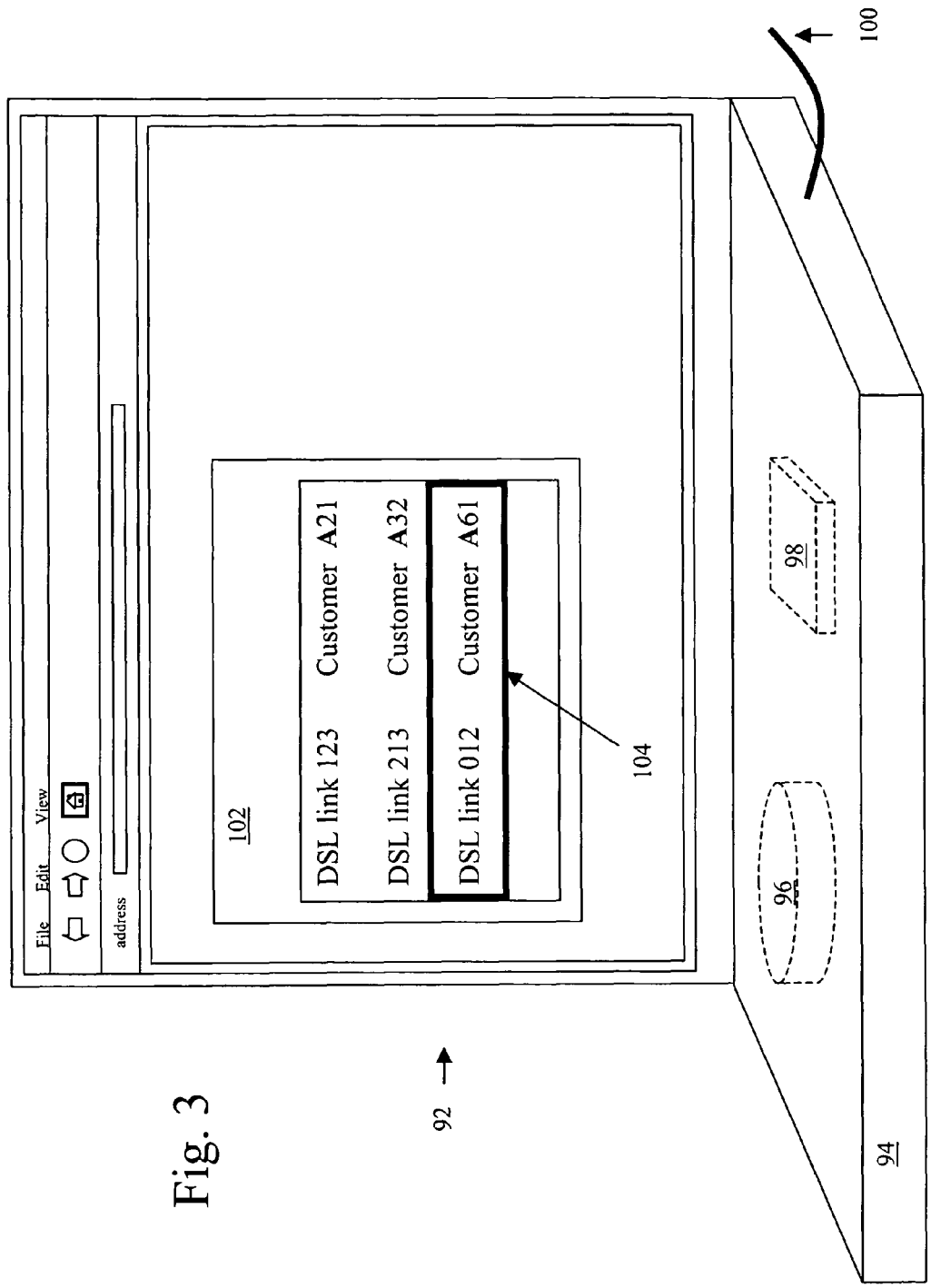
FIG. 3 shows one embodiment of an information access system that incorporates teachings of the present disclosure to maintain and access network information in an efficient manner.

However received, information stored in memory 96 may be identifiable and searchable by one or more keys. As shown in FIG. 3, system 92 may allow for the presentation of a GUI element 102 that shows in a text format information representing tracked metrics for a network node. As shown, "DSL link 012" may have been selected by the user as indicated by selector box 104. DSL link 012 may be associated with a particular customer "A61." Depending upon implementation detail, the customer number or some portion of the customer number may be used as a searchable key. For example, the "A" of A61 may represent the location of the customer (e.g., Austin, Tex.).

In operation, a user may have asked system 92 to return DSL link numbers for customers living in Austin. Memory 96 may have utilized the "A" in the customer identifier as the key and returned the found results to the user in GUI element 102. In some embodiments, additional information associated with the displayed information may be available. As such, the user of system 92 may click on DSL link 012 to gain access to whatever additional information is available.

Many of the above techniques may be provided by a computing device executing one or more software applications or engines. The software may be executing on a single computing platform or more than one. The platforms may be highly capable workstations, personal computers, microprocessors, servers, or other devices capable of performing the techniques. The device or devices may have a computer-readable medium having computer-readable instructions to direct a processor to create a structured text object that includes a first and a second tracked metric for a network node, to compress the structured text object into a compressed form, to receive a request for the first metric, to retrieve the compressed form of the structured text object, to uncompress the compressed form, and to initiate communication of a response to the request that comprises the metric.

It should be understood that the mechanisms, computers, devices, engines, servers, and/or platforms, described herein, may take several different forms and may be stand alone and/or incorporated into several different pieces of equipment, like laptop computers, desktop computers, telephones, mainframes, PSTN switches, Ethernet switches, routers, gateways, hardware, firmware, software, work stations, other options having some level of computing capability, and/or a combination thereof. For example, various engines could be independent applications, could be independent servers, could be executing on different platforms, and/or could be executing on a single platform.

The methods and systems described herein provide for an adaptable implementation. Although certain embodiments have been described using specific examples, it will be apparent to those skilled in the art that the invention is not limited to these few examples. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A method of storing network element information, the method comprising:
   receiving metric information of at least two metrics for a network element of a communication network from the network element at a centralized network-based repository of metric information, the repository operable in a service bureau mode to provide element management services for different types of communication network elements of a plurality of communication networks, the element management services including obtaining and maintaining metric information from each of the plurality of communication networks, wherein the metric information is accessible via a graphical user interface;
   generating a structured text object including the metric information for the network element, the structured text object containing multiple pieces of information associated with the network element, wherein the structured text object includes an extensible markup language object;
   automatically compressing the structured text object into a binary element;
   storing the binary element in a memory device;
   associating an identification key with the binary element to enable retrieving of the binary element, wherein the identification key includes a customer identifier associated with a particular customer;
   receiving a request from an access device for the metric information, wherein the request includes a portion of the customer identifier;
   determining an access device type of the access device;
   retrieving the binary element based on the portion of the customer identifier;
   translating at least a portion of the metric information from the binary element into a signal based on the access device type; and
   sending the signal to the access device.

2. The method of claim 1, wherein the memory device includes a data store and wherein the binary element is stored in a single table location of the data store.

3. The method of claim 1, further comprising receiving a request to move legacy metric information related to a particular network element from a legacy storage system to the memory device, wherein the legacy metric information includes a first metric stored in a first table location and a second metric stored in a second table location.

4. The method of claim 3, further comprising modifying the structured text object for the particular network element to include the first metric and the second metric.

5. The method of claim 1, wherein the customer identifier includes a digital subscriber line link number associated with the particular customer and wherein the portion of the customer identifier includes data representing a location of the particular customer, the method further comprising generating search results based on data representing the location, the search results including a list of customers associated with the location, and receiving input selecting data associated with the particular customer, wherein the binary element is retrieved in response to the input.

6. The method of claim 1, further comprising:
   receiving second metric information from a second network element, the second metric information related to a plurality of metrics associated with the second network element;
   generating a second structured text object including the second metric information of the second network element;
   compressing the second structured text object into a second binary element; and
   storing the second binary element in the memory device.

7. The method of claim 6, further comprising:
   receiving a second request regarding metric information associated with a particular metric included in at least one of the structured text object and the second structured text object;
   retrieving at least one of the binary element and the second binary element including the requested metric information;
   uncompressing at least one of the binary element and the second binary element; and
   presenting the metric information associated with the particular metric via the graphical user interface.

8. The method of claim 1, wherein at least one field of the structured text object is a voice mark-up language and wherein the method further comprises presenting the at least one field via a speech recognition engine.

9. The method of claim 1, wherein a particular field of the structured text object is populated with metric information entered by a user.

10. The method of claim 1, wherein receiving the metric information comprises querying a management information base of the network element and receiving protocol data units from the management information base.

11. The method of claim 1, wherein the communication network comprises a wireless network.

12. The method of claim 1, wherein the communication network comprises a public internet.

13. The method of claim 1, wherein the binary element has only one measured value for each metric of the at least two metrics.

14. The method of claim 1, wherein the request is received via a haptic-based interaction.

15. The method of claim 1, wherein the request is received via a gesture-based interaction.

16. The method of claim 1, wherein the metric information is received via common management information protocol.

17. A computer-readable storage medium including instructions executable by a processor to:
   receive metric information for a plurality of metrics from network elements of a communication network at a centralized network-based repository of metric information, the metric information associated with the network elements, wherein the metric information relates to at least one of a customer billing cycle, a customer account number, and a customer elected service, and wherein the metric information is accessible via a graphical user interface;
   generate a structured text object including the metric information for each of the network elements, wherein the structured text object includes a plurality of fields that are populated with the metric information for at least one of the network elements, the structured text object containing multiple pieces of information associated with the network elements, wherein the structured text object includes an extensible markup language object;

produce a compressed form of the structured text object;

store the compressed form of the structured text object in a memory;

associate an identification key with the compressed form of the structured text object to enable retrieval of the compressed form of the structured text object, wherein the identification key includes a customer identifier associated with a particular customer;

receive a request from an access device for the metric information, wherein the request includes a portion of the customer identifier;

determine an access device type of the access device;

retrieve the compressed form of the structured text object based on the portion of the customer identifier;

translate at least a portion of the metric information from the compressed foil of the structured text object into a signal based on the access device type; and send the signal to the access device.

18. The computer readable storage medium of claim 17, further comprising instructions executable by the processor to:

receive a second request regarding metric information associated with a particular metric included in the structured text object;

retrieve the compressed form of the structured text object;

uncompress the compressed form of the structured text object;

present the metric information associated with the particular metric via the graphical user interface; and present additional information related to the metric information associated with the particular metric in response to an input entered via the graphical user interface.

19. The computer readable storage medium of claim 17, wherein the signal comprises a voice signal, a visual representation, text information, or any combination thereof.

20. The computer readable storage medium of claim 17, wherein at least one of the network elements is a public switched telephone network switch.

21. The computer readable storage medium of claim 17, wherein at least one of the network elements is an Ethernet switch.

22. The computer readable storage medium of claim 17, wherein at least one of the network elements is a router.

* * * * *